US011272328B1

(12) United States Patent
Paras Ram et al.

(10) Patent No.: US 11,272,328 B1
(45) Date of Patent: Mar. 8, 2022

(54) METHOD AND APPARATUS FOR CHANGING A TALKGROUP ICON

(71) Applicant: MOTOROLA SOLUTIONS, INC., Chicago, IL (US)

(72) Inventors: Anoop Sehgal Paras Ram, Ipoh (MY); Chong Keat Chua, Ayer Itam (MY); Chun Meng Tan, Bayan Lepas (MY); Kim Koon Neoh, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/142,269

(22) Filed: Jan. 6, 2021

(51) Int. Cl.
*H04W 4/10* (2009.01)
*H04W 4/08* (2009.01)
*H04M 3/51* (2006.01)

(52) U.S. Cl.
CPC ........... *H04W 4/10* (2013.01); *H04M 3/5116* (2013.01); *H04W 4/08* (2013.01)

(58) Field of Classification Search
CPC ... H04W 4/06–10; H04W 84/08; H04W 4/08; H04M 3/5116
See application file for complete search history.

(56) References Cited

U.S. PATENT DOCUMENTS

| | | | |
|---|---|---|---|
| 6,735,564 B1* | 5/2004 | Puhakainen | H04W 84/08 704/246 |
| 7,369,869 B2 | 5/2008 | Wiatrowski et al. | |
| 7,916,123 B2 | 3/2011 | Robertson et al. | |
| 8,208,393 B2 | 6/2012 | Belmonte et al. | |
| 9,998,895 B1* | 6/2018 | Schuler | H04W 4/02 |
| 10,389,662 B2 | 8/2019 | Chudge et al. | |
| 10,721,599 B1* | 7/2020 | Lim | H04W 4/10 |
| 2013/0059622 A1* | 3/2013 | Agulnik | H04W 4/08 455/518 |
| 2015/0065186 A1* | 3/2015 | Mohd Mohdi | H04W 76/45 455/518 |
| 2015/0072716 A1 | 3/2015 | Klein et al. | |
| 2017/0010903 A1 | 1/2017 | Kidron et al. | |
| 2017/0339535 A1* | 11/2017 | Mazzarella | H04L 65/1059 |
| 2019/0014602 A1 | 1/2019 | Namboodiri et al. | |
| 2020/0252758 A1* | 8/2020 | Gan | H04W 88/022 |

* cited by examiner

*Primary Examiner* — Raymond S Dean (57) ABSTRACT

A method and apparatus for changing a talkgroup icon is provided herein. During operation a current public-safety incident is determined. Based on the current public safety incident, a talkgroup icon will be determined and pushed to the various radios that are members of the talkgroup. When a radio displays a list of talkgroups (or a single talkgroup), each talkgroup will be accompanied by the unique icon that identifies a public-safety incident related to the talkgroup. This allows a user of the radio to identify a current conversation on a particular talkgroup without having to monitor the particular talkgroup.

13 Claims, 6 Drawing Sheets

METHOD AND APPARATUS FOR CHANGING A TALKGROUP ICON

BACKGROUND OF THE INVENTION

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

As part of a first responder's duties, the first responder may be assigned to multiple talkgroups which they are allowed receive and transmit. Since only a limited amount of talkgroups may typically be monitored at a time, it would be beneficial if a first responder could somehow know the subject of conversations on the talkgroups that are not currently being monitored.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for changing a talkgroup icon is provided herein. During operation a current public-safety incident is determined. Based on the current public safety incident, a talkgroup icon will be determined and pushed to the various radios that are members of the talkgroup. When a radio displays a list of talkgroups (or a single talkgroup), each talkgroup will be accompanied by the talkgroup icon that identifies a public-safety incident related to the talkgroup. This allows a user of the radio to identify a current conversation on a particular talkgroup without having to monitor the particular talkgroup.

The public-safety incident related to the talkgroup may be determined by monitoring the speech transmitted over the talkgroup, and determining an appropriate icon based on the speech transmitted over the talkgroup. Alternatively, a public-safety incident related to the talkgroup may be determined based on an incident assigned to at least some members of the talkgroup, as determined, for example, by a computer-aided dispatch identification (CADID) assigned to at least some members of the talkgroup.

In one embodiment of the present invention, an audible tone is output whenever a talkgroup has its icon changed so that a member of that talkgroup may be notified of the change without having to continuously look at the talkgroup icons.

Consider the following example: A first responder is a member of multiple talkgroups, but is currently listening to only one talkgroup (e.g., a fire ground talkgroup). A bank robbery has just occurred, and various members of a police talkgroup are assigned to handle the bank robbery. A computer-aided dispatch (CAD) incident identifier (ID) is assigned to the various members of the police talkgroup that are assigned to handle the bank robbery. This ID could be something as simple as a number, or something as complicated as an identification that is a function of populated fields, one of which may comprise an incident type. Based on the CADID changing for various members of the police talkgroup, each radio assigned to the police talkgroup will have an icon changed for that talkgroup to reflect the fact that the conversation over the police talkgroup will now comprise discussion surrounding the bank robbery. Anyone looking at the icon will quickly realize that the conversation on the police talkgroup involves a particularly-high-level incident that will need police attention.

It should be noted that since the police officers assigned to the police talkgroup may be a member of many other talkgroups, it may not be appropriate to have all talkgroup icons for the other talkgroups change based on the bank robbery occurring. For example, a city maintenance talkgroup should not have its talkgroup icon changed just because several members of the city maintenance talkgroup are assigned to the bank robbery, since conversations about the bank robbery will most certainly take place on the police talkgroup. Therefore, in one embodiment of the present invention, the change in a CADID for a member of a talkgroup will only cause the talkgroup icon to change if the current CADID is related to the talkgroup. For example, a bank robbery will not be related to a city maintenance talkgroup.

Consider another example of various persons assigned to a city maintenance talkgroup are currently working on a water-main break at 123 Main Street. The conversation on the city maintenance revolves around fixing the water-main break. When this conversation is detected, the city maintenance talkgroup will have its associated icon changed to reflect that this work is taking place.

In another embodiment the talkgroup icon may only update when the active members within the talkgroup were assigned to handle an active incident. Consider an example where a plurality of active talkgroup members in a city maintenance talkgroup are currently assigned to work on a traffic-light breakdown at 456 Main Street, and the number of such active talkgroup members assigned to the traffic-light breakdown task had overcome a certain headcount threshold for example 70% of the active city maintenance talkgroup members are assigned to handle such traffic-light breakdown task. When the conversation on the traffic-light breakdown task is detected, the city maintenance talkgroup will have its associated icon changed to reflect that this work is taking place. Therefore, in this embodiment, the talkgroup icon is only changed once a predetermined percentage of individuals assigned to the talkgroup are also assigned to a same task.

Figure 1:
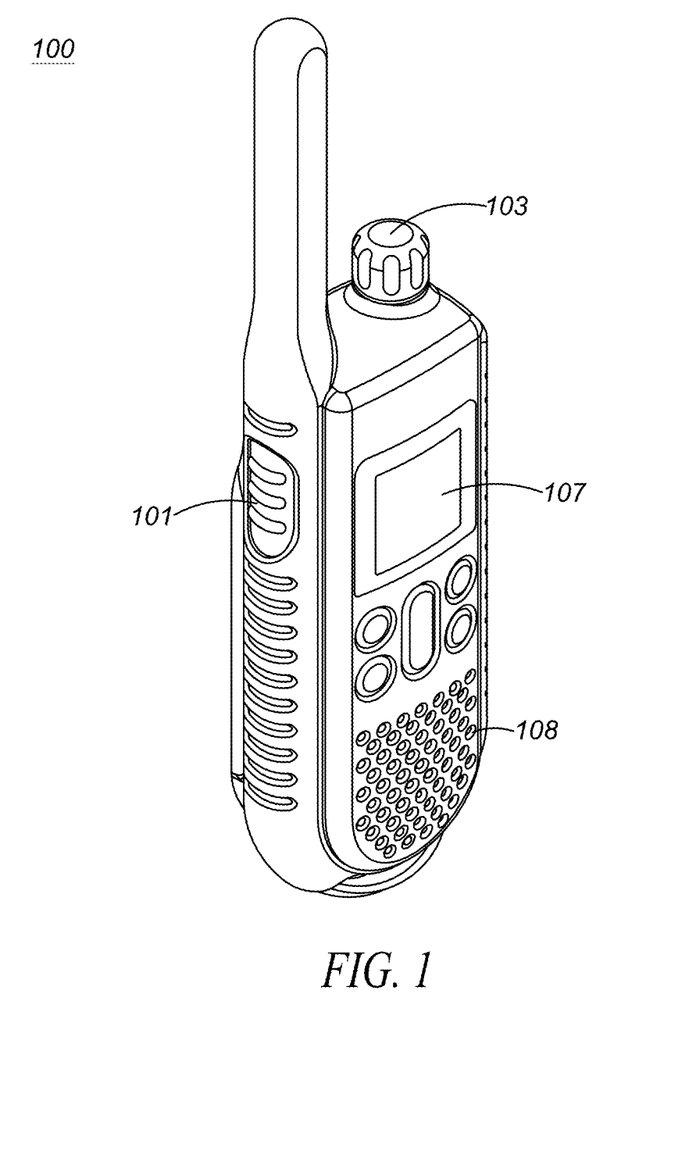
FIG. 1 illustrates push-to-talk (PTT) radio.

FIG. 1 illustrates push-to-talk (PTT) radio 100. As shown, radio 100 comprises PTT button 101, knob 103, display/screen 107, and speaker/microphone 108. PTT button 101 comprises a standard button, that when pressed, transitions radio 100 from a listening state, to a transmit state, transmitting over a specific talkgroup. Display 107 comprises a way of conveying (e.g., displaying) PTT information to the user. In particular, in an embodiment, a talkgroup may be displayed to the user as an alpha-numeric output on display 107 along with an icon representing a current subject matter discussed over the talkgroup. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user 201 (shown in FIG. 2) preferably grips or contacts the circumferential surface of knob 103 and rotates it a desired amount to scroll through menu items, for example, talkgroups that may be selected. Once knob 103 is rotated to highlight a particular talkgroup, conversations over that talkgroup will be output to speaker 108, and any activation (pushing) of the PTT button 101 will cause radio 100 to communicate over the highlighted talkgroup.

It should be noted that display 102 may take many forms, and may display the names of the talkgroups and an associated icon 202, 203, 204 for that talkgroup that indicates a current topic of conversation over that talkgroup. For example, as shown in FIG. 2, the Police Talkgroup and the Fire ground talkgroup may be displayed, so when highlighted, communications to other police officers or firemen take place upon the pushing of the PTT button 101.

Figure 2:
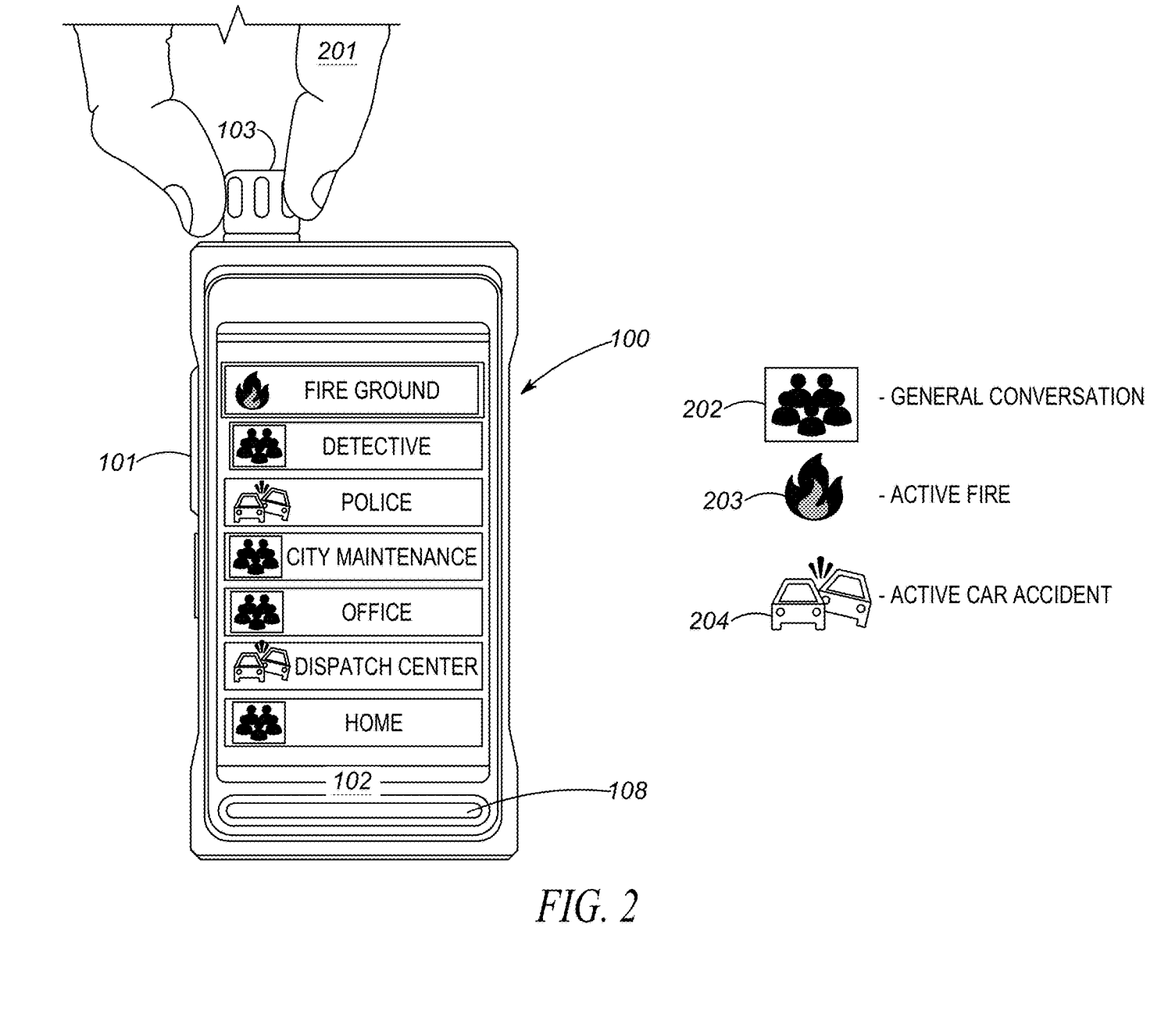
FIG. 2 illustrates push-to-talk (PTT) radio.

It should also be noted that in FIG. 2, the various talkgroups displayed have an associated icon 202-204 that identifies a current subject matter (e.g., a current conversation) being discussed on that talkgroup. For example, as shown, the main conversation over fire ground talkgroup is related to an active fire, while the conversation over the detective talkgroup is currently not related to any specific incident, and the conversation over the police talkgroup is related to an active automobile accident.

Figure 3:
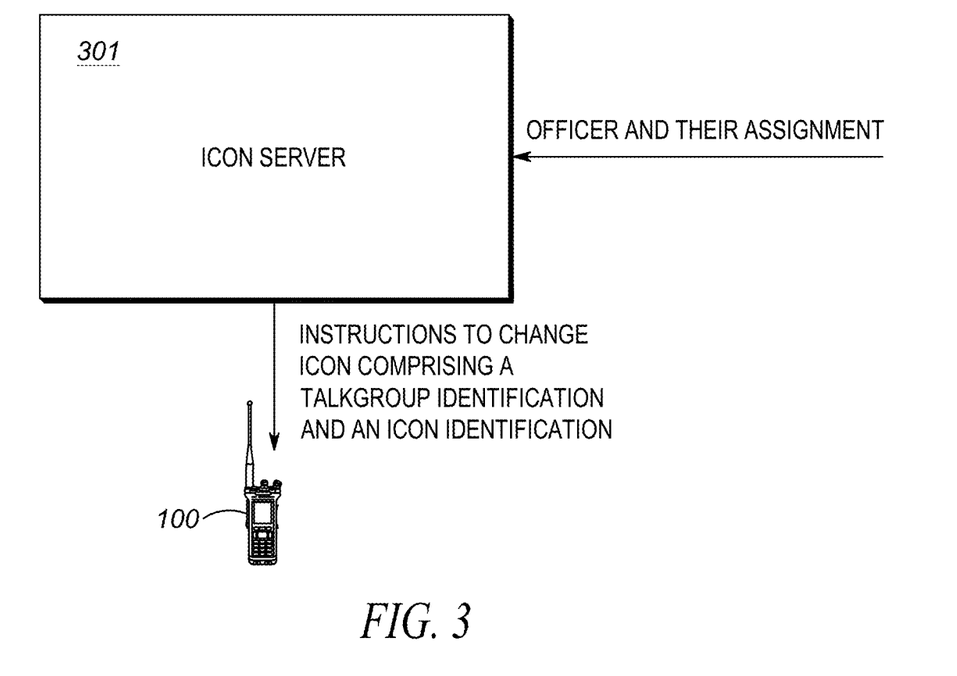
FIG. 3 illustrates a server.

In order to accomplish the above, an icon server 301 is provided (shown in FIG. 3). Icon server 301 is operable to determine subject matter related to a talkgroup, and push an icon to a radio based on the subject matter related to the talkgroup. An icon is a pictogram or ideogram displayed on a radio screen in order to help the user determine a current subject matter of conversation over the talkgroup. Thus, the icon itself is a quickly comprehensible symbol of a current subject matter (e.g., a conversation taking place) on the talkgroup. Their placement on the screen, in proximity to a particular talkgroup, will indicate a conversation topic being discussed on the talkgroup identified that is closest to the icon.

As discussed above, the topic of conversation being discussed on a talkgroup can be inferred from a task assignment assigned to at least one officer assigned to the talkgroup (as indicated in a CADID assigned to the officer). Thus, as shown in FIG. 3, in one embodiment, an officer and their assignment is provided to server 301, server 301 then outputs instructions for radio 100 to change an icon based on the CADID assigned to at least one officer utilizing the talkgroup.

Figure 4:
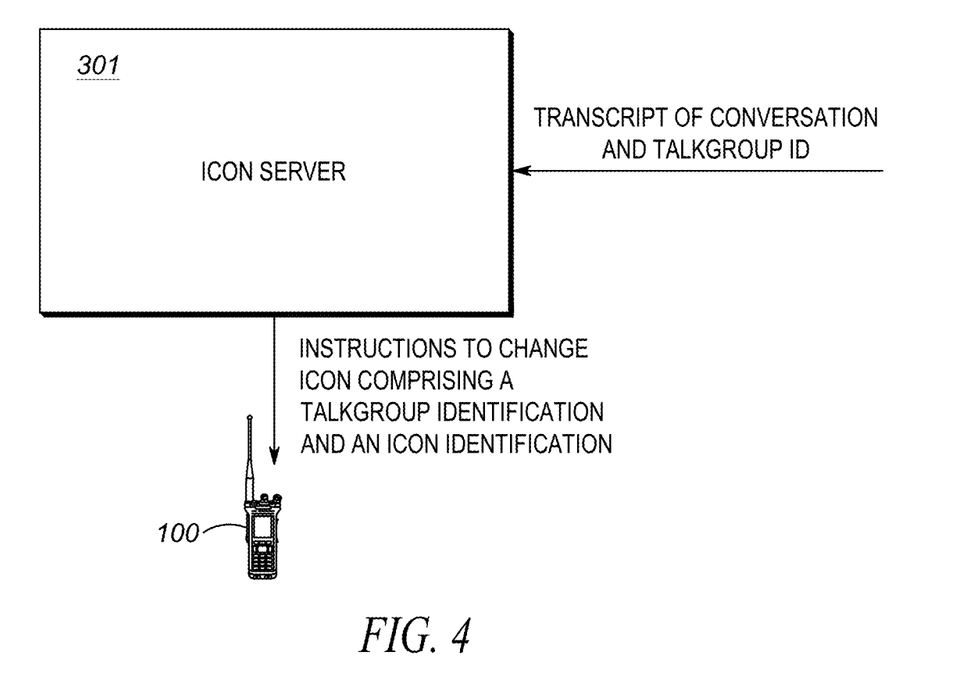
FIG. 4 illustrates a server.

In another embodiment of the present invention, the topic of conversation over a talkgroup can be inferred from an actual conversation taking place over the talkgroup. Thus, as shown in FIG. 4, a transcript of conversation and a talkgroup identification is input into icon server. Keywords from the transcript are detected by server 301 to determine a topic of conversation occurring over the talkgroup. Server 301 then outputs instructions for radio 100 to change an icon based on the topic of conversation taking place over the talkgroup.

It should be noted that once an icon has been updated on a radio, a minimum amount of time needs to pass before the icon may be changed. This is to ensure that the icons are not changing to rapidly which may confuse a user of the radio 100.

Figure 5:
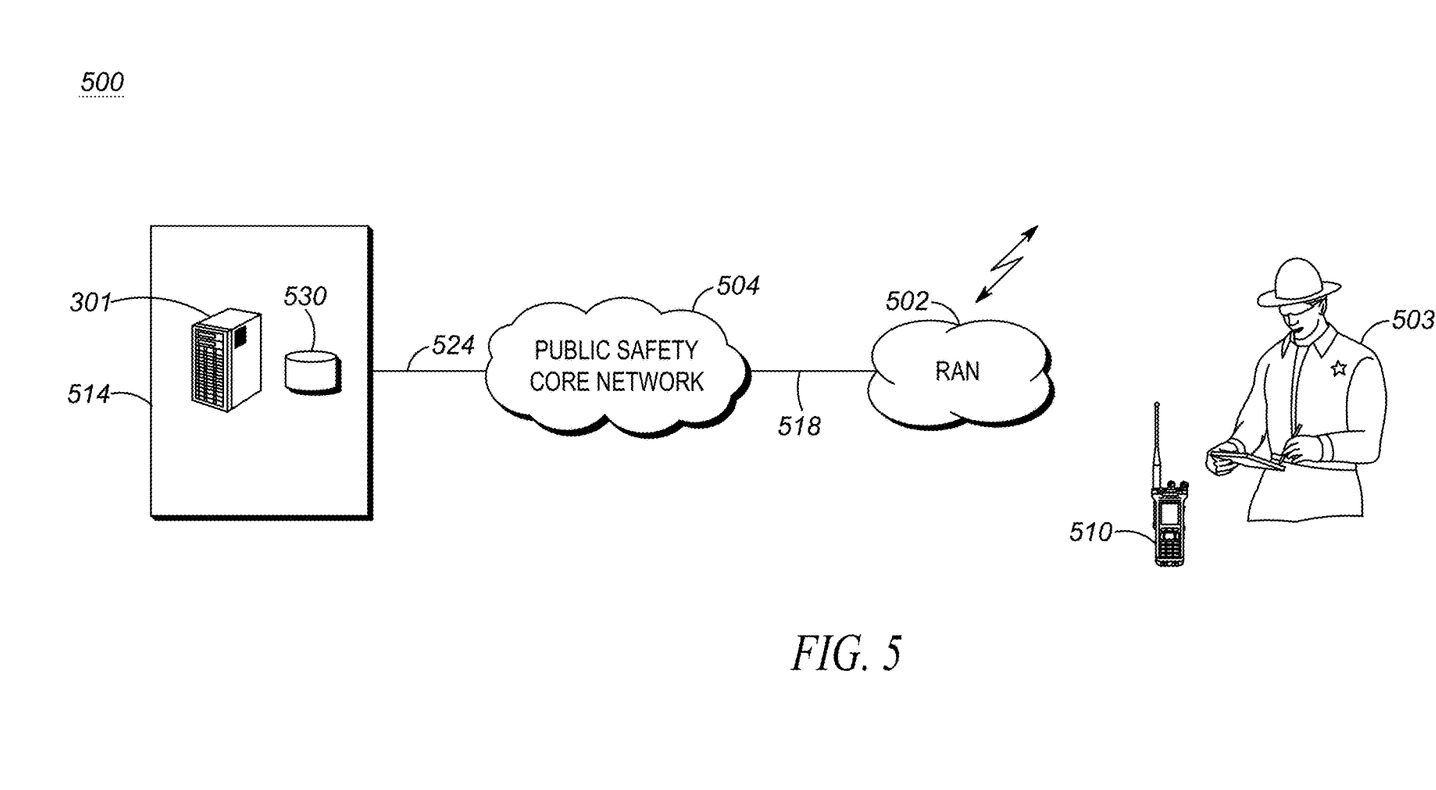
FIG. 5 depicts an example communication system that incorporates an icon server.

FIG. 5 illustrates a general operating environment for the present invention. Environment 500 includes one or more radio access networks (RANs) 502 (only one shown in FIG. 5), a public-safety core network 504, radio 510, dispatch center 514, and communication links 518, 524. In a preferred embodiment of the present invention, dispatch center 514 serves as a public-safety dispatch center 514. Server 301 receives information about various talkgroups and outputs instructions for radios to change their talkgroup icons as discussed above.

Database 530 is provided, and stores tables that associates a CADID to a talkgroup icon and talkgroup, as well as storing keywords and their associated talkgroup icon. Database 530 also comprises a list of officers and their assigned talkgroups. This is illustrated in Table 1, Table 2, and Table 3 below.

TABLE 1

CADID and associated icons for various talkgroups

| CADID | ICON | MAIN TALKGROUP |
|---|---|---|
| 2012022 (Fire) | Flame | Fire Talkgroup |
| 2012034 (Robbery) | Head with facemask | Police Talkgroup |
| . . . | . . . | . . . |

TABLE 2

Keyword and associated icon for talkgroup.

| Keyword | ICON |
|---|---|
| Fire | Flame |
| Robbery | Head with facemask |
| . . . | . . . |

TABLE 3

First responders and their assigned talkgroups

| First Responder | Assigned Talkgroups |
|---|---|
| Officer Smith | Police Talkgroup, City Maintenance Talkgroup |
| Officer Jones | Fire Talkgroup |
| . . . | . . . |

Each RAN 502 includes typical RAN elements such as base stations, base station controllers (BSCs), routers, switches, and the like, arranged, connected, and programmed to provide wireless service to user equipment (e.g., radio 510) operated by officers 501-503) in a manner known to those of skill in the relevant art. RANs may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

Radio 510 may be any suitable computing and/or communication devices operable to engage in wireless communication over an air interface as is known to those in the relevant art. Radio 510 comprises any device capable of communication over a talkgroup. Mobile radio 510 may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

It should be noted that while only a single officer 503 and radio 510 are shown in FIG. 5, one of ordinary skill in the art will recognize that hundreds of officers and radios may actually exist in environment 500.

Figure 6:
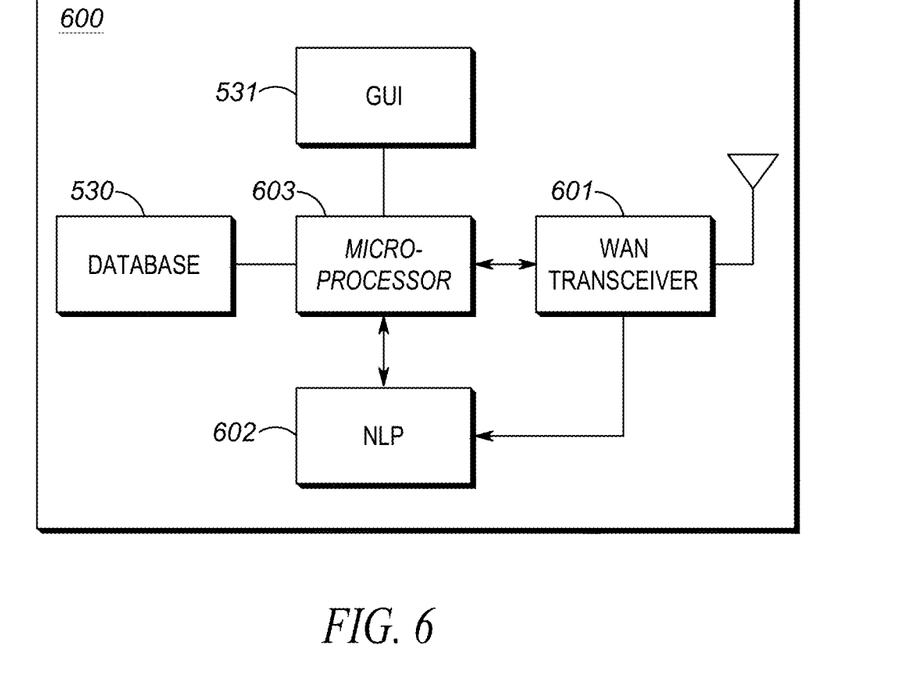
FIG. 6 is a block diagram of an icon server.

With the above in mind, FIG. 6 sets forth a block diagram that illustrates device 600 for pushing instructions for a radio to update a talkgroup icon as described above. In an embodiment, the device is embodied within dispatch center 514, however in alternate embodiments the device may be embodied within the public-safety core network 504, or more computing devices in a cloud compute cluster (not shown), or some other communication device not illustrated in FIG. 5, and/or may be a distributed communication device across two or more entities.

FIG. 6 shows those components (not all necessary) for device 600 to push talkgroup icon updates to radios as described above. As shown, device 600 may include a wide-area-network (WAN) transceiver 601 (e.g., a transceiver that utilizes a public-safety communication-system protocol), Natural Language Processor (NLP) 602, logic circuitry 603 (which may serve as an icon server). In other implementations, device 600 may include more, fewer, or different components. Regardless, all components are connected via common data busses as known in the art.

WAN transceiver 601 may comprise well known long-range transceivers that utilize any number of network system protocols. (As one of ordinary skill in the art will recognize, a transceiver comprises both a transmitter and a receiver for transmitting and receiving data). For example, WAN transceiver 601 may be configured to utilize a next-generation cellular communications protocol operated by a cellular service provider, or any public-safety protocol such as an APCO 25 network or the FirstNet broadband network. WAN transceiver 601 receives communications from all members of all talkgroups, as well as sensor data from all users. It should be noted that WAN transceiver 601 is shown as part of device 600, however, WAN transceiver 601 may be located in RAN 502 (e.g., a base station of RAN 502), with a direct link to device 600.

Natural-Language Processor (NLP) 602 may be a well known circuitry to analyze, understand, and derive meaning from human language in a smart and useful way. By utilizing NLP, an automatic summarization of a conversation over a particular talkgroup is provided to logic circuitry 603. More specifically, NLP 602 monitors conversations occurring on at least one talkgroup, and provides a textual summary of the conversation and talkgroup ID to logic circuitry 603.

Graphical-User Interface (GUI) 531 is provided. More particularly, GUI 531 provides a man/machine interface for receiving an input from a user. For example, GUI 531 provides a way for a user (e.g., a dispatch operator) to assign a CADID to a user and provide this information to logic circuitry 603. In order to provide the above features (and additional features), GUI 506 may comprise any combination of a touch screen, a computer screen, a keyboard, or any other interface needed to receive a user input and provide information to the user.

Database 530 is provided. Database 530 comprises standard memory (such as RAM, ROM, . . . , etc) and serves to store the information conveyed in Table 1 and Table 2.

Logic circuitry 603 comprises a digital signal processor (DSP), general purpose microprocessor, a programmable logic device, or application specific integrated circuit (ASIC) and is configured to function as an icon server. When functioning as an icon server, logic circuitry 603 is configured to receive a CADID assigned to a first responder, and access database 530 to determine those talkgroups that are assigned to the first responder. From this information, Table 1 may be accessed to determine if the first responder is a member of any talkgroup that should have its icon changed based on the CADID. If so, the icon is pushed to all member radios that belong to the talkgroup. In a similar manner logic circuitry 603 is also configured to receive a transcript of a conversation over the talkgroup and access Table 2 to determine if any keywords are present. If so, an appropriate icon is determined and is pushed to all member radios that belong to the talkgroup.

Thus, as shown in FIG. 6, an apparatus is provided that comprises logic circuitry configured to determine a public-safety incident assigned to a first responder and determine a talkgroup icon based on the public-safety incident assigned to the first responder. A transmitter is provided, and configured to transmit data identifying the talkgroup icon and data identifying a talkgroup, causing the radio to display the talkgroup icon in proximity to text of the talkgroup.

As discussed above, the logic circuitry may also be configured to determine the talkgroup based on the first responder being a member of the talkgroup. The logic circuitry may also be configured to receive a computer-aided dispatch identification (CADID) assigned to the first responder, and wherein the public-safety incident assigned to the first responder is determined from the CADID.

As shown in FIG. 6, a database is provided containing public-safety incidents and their associated talkgroups, and wherein the logic circuitry may determine the talkgroup by accessing the database.

A natural-language processor (NLP) is shown in FIG. 6 and configured to output a representation of speech that is spoken over the talkgroup. The logic circuitry may additionally determine the talkgroup based on the speech that is spoken over the talkgroup. With this in mind, the database may include a list of keywords and their associated talkgroup icons, and wherein the logic circuitry determines the talkgroup icon by accessing the database.

As discussed above, the talkgroup icon displayed next to text of the talkgroup may only be changed if a predetermined number or percentage of first responders assigned to the talkgroup are also assigned to the public-safety incident. With this in mind; the logic circuitry may determine the number or percentage of first responders assigned to the talkgroup that are also assigned to the public-safety incident, and wherein the talkgroup icon is also based on if the predetermined number or percentage of first responders assigned to the talkgroup are also assigned to the public-safety incident.

Figure 7:
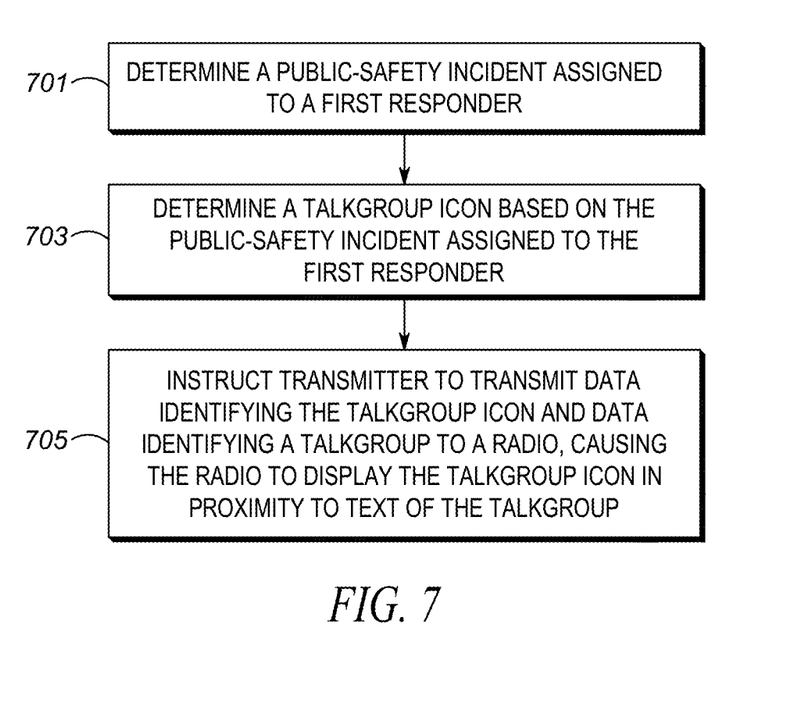
FIG. 7 is a flow chart showing operation of the server of FIG. 5.

FIG. 7 is a flow chart showing operation of device 600. The logic flow begins at step 701 where logic circuitry 603 determines a public-safety incident assigned to a first responder. As discussed above, this information may come from GUI 531 from an dispatch operator inputting this information into logic circuitry 603. At step 703 logic circuitry determines a talkgroup icon based on the public-safety incident assigned to the first responder and instructs transmitter 601 to transmit data identifying the talkgroup icon and data identifying a talkgroup to a radio (step 705), causing the radio to display the talkgroup icon in proximity to text of the talkgroup.

As discussed above, the talkgroup icon for a talkgroup is only changed when the first responder is a member of that talkgroup. Therefore, logic circuitry is configured to access database 530 to determine talkgroups assigned to the first responder and then determine the talkgroup based on the first responder being a member of the talkgroup.

As discussed above, logic circuitry 603 may receive a computer-aided dispatch identification (CADID) assigned to the first responder, and the public-safety incident assigned to the first responder is determined from the CADID.

As discussed above, NLP 602 may provide speech spoken over the talkgroup to logic circuitry 603 and the talkgroup icon can also be determined based on the speech that is spoken over the talkgroup.

Finally, logic circuitry 603 may access database 530 to determine a predetermined number or percentage of public-safety officers assigned to the talkgroup also being assigned to the incident. Logic circuitry 603 may only change the talkgroup icon if the predetermined number or percentage of public-safety officers assigned to the talkgroup also being assigned to the incident.

Figure 8:
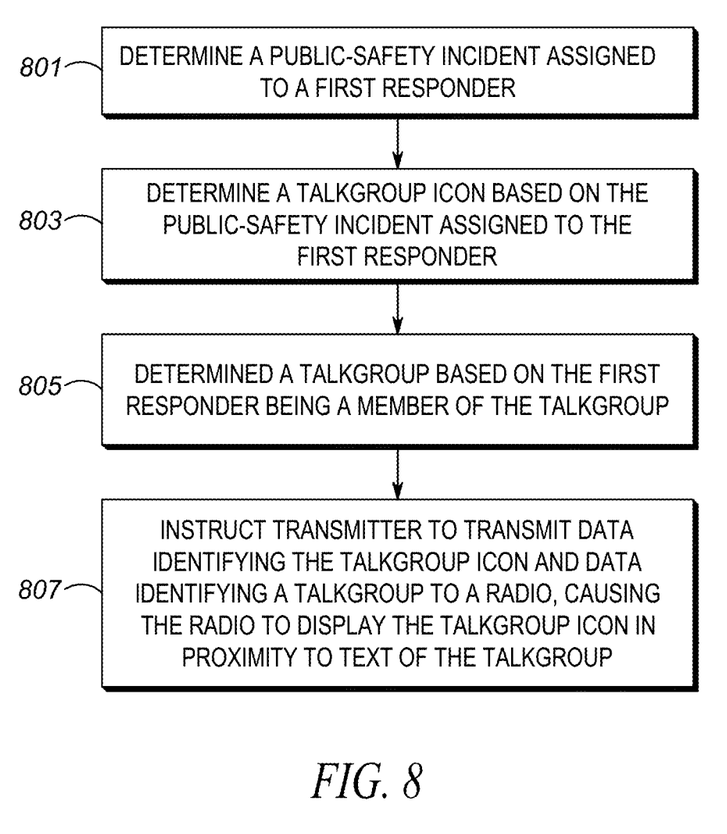
FIG. 8 is a flow chart showing operation of the server of FIG. 5.

FIG. 8 is a flow chart showing operation of device 600. The logic flow begins at step 801 where logic circuitry 603 determines a public-safety incident assigned to a first responder. At step 803, logic circuitry 603 also determines a talkgroup icon based on the public-safety incident assigned to the first responder. A talkgroup is then determined based on the first responder being a member of the talkgroup (step 805), and at step 807, transceiver 601 transmits data identifying the talkgroup icon and data identifying the talkgroup to a radio, causing the radio to display the talkgroup icon in proximity to text of the talkgroup.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   logic circuitry configured to:
      determine a public-safety incident assigned to a first responder;
      determine if a predetermined number or percentage of first responders assigned to a talkgroup are also assigned to the public-safety incident;
      determine a talkgroup icon based on the public-safety incident assigned to the first responder, wherein the talkgroup icon is also based on if the predetermined number or percentage of first responders assigned to the talkgroup are also assigned to the public-safety incident
      a transmitter configured to transmit data identifying the talkgroup icon and data identifying a talkgroup to a radio, causing the radio to display the talkgroup icon in proximity to text of the talkgroup.

2. The apparatus of claim 1 wherein the logic circuitry is also configured to:
   determine the talkgroup based on the first responder being a member of the talkgroup.

3. The apparatus of claim 1 wherein the logic circuitry is also configured to receive a computer-aided dispatch identification (CADID) assigned to the first responder, and wherein the public-safety incident assigned to the first responder is determined from the CADID.

4. The apparatus of claim 1 further comprising:
   a database containing public-safety incidents and their associated talkgroups; and
   wherein the logic circuitry determines the talkgroup by accessing the database.

5. The apparatus of claim 1 further comprising:
   a natural-language processor (NLP) configured to output a representation of speech that is spoken over the talkgroup; and wherein the logic circuitry additionally determines the talkgroup based on the speech that is spoken over the talkgroup.

6. The apparatus of claim 5 wherein a database includes a list of keywords and their associated talkgroup icons, and wherein the logic circuitry determines the talkgroup icon by accessing the database.

7. A method comprising the steps of:
determining a public-safety incident assigned to a first responder;
determining a predetermined number or percentage of public-safety officers assigned to a talkgroup also being assigned to the public-safety incident;
determining a talkgroup icon based on the public-safety incident assigned to the first responder and also based on the predetermined number or percentage of public-safety officers assigned to the talkgroup also being assigned to the incident;
transmitting data identifying the talkgroup icon and data identifying the talkgroup to a radio, causing the radio to display the talkgroup icon in proximity to text of the talkgroup.

8. The method of claim 7 further comprising the steps of:
additionally determining the talkgroup based on the first responder being a member of the talkgroup.

9. The method of claim 7 further comprising the step of:
receiving a computer-aided dispatch identification (CADID) assigned to the first responder, and wherein the public-safety incident assigned to the first responder is determined from the CADID.

10. The method of claim 7 further comprising the step of:
determining speech spoken over the talkgroup; and
wherein the talkgroup icon is also determined based on the speech that is spoken over the talkgroup.

11. A method comprising the steps of:
determining a public-safety incident assigned to a first responder;
determining a predetermined number or percentage of public-safety officers assigned to a talkgroup also being assigned to the public-safety incident;
determining a talkgroup icon based on the public-safety incident assigned to the first responder, and also based on the predetermined number or percentage of public-safety officers assigned to the talkgroup also being assigned to the incident;
transmitting data identifying the talkgroup icon and data identifying the talkgroup to a radio, causing the radio to display the talkgroup icon in proximity to text of the talkgroup.

12. The method of claim 11 further comprising the step of:
receiving a computer-aided dispatch identification (CADID) assigned to the first responder, and wherein the public-safety incident assigned to the first responder is determined from the CADID.

13. The method of claim 11 further comprising the step of:
determining speech spoken over the talkgroup; and
wherein the talkgroup icon is also determined based on the speech that is spoken over the talkgroup.

* * * * *